US008787159B2

(12) United States Patent
Barclay et al.

(10) Patent No.: US 8,787,159 B2
(45) Date of Patent: Jul. 22, 2014

(54) MECHANISM FOR WIRELESS ACCESS NETWORKS TO THROTTLE TRAFFIC DURING CONGESTION

(75) Inventors: Deborah L. Barclay, Winfield, IL (US); Frank M. Alfano, Wheaton, IL (US)

(73) Assignee: Alcatel Lucent, Boulogne Billancourt (FR)

( * ) Notice: Subject to any disclaimer, the term of this patent is extended or adjusted under 35 U.S.C. 154(b) by 328 days.

(21) Appl. No.: 13/066,401

(22) Filed: Apr. 14, 2011

(65) Prior Publication Data
US 2012/0263036 A1 Oct. 18, 2012

(51) Int. Cl.
*H04L 12/26* (2006.01)

(52) U.S. Cl.
USPC ........... 370/230; 370/229; 370/232; 370/328; 370/338; 370/447; 455/406; 455/434; 455/435.2; 455/450

(58) Field of Classification Search
CPC ...................................................... H04L 29/06
USPC ......... 370/229, 230, 232, 238, 328, 338, 349, 370/445, 447; 455/406, 418, 434, 435.2, 455/450, 550.1
See application file for complete search history.

(56) References Cited

U.S. PATENT DOCUMENTS

| | | | | |
|---|---|---|---|---|
| 6,078,959 | A * | 6/2000 | Wright et al. ................. | 709/227 |
| 6,374,112 | B1 * | 4/2002 | Widegren et al. .......... | 455/452.2 |
| 6,738,368 | B1 * | 5/2004 | Terry ............................. | 370/342 |
| 6,912,390 | B2 * | 6/2005 | Andersson et al. ........... | 455/436 |
| 6,965,942 | B1 * | 11/2005 | Young et al. .................. | 709/232 |
| 6,999,759 | B2 * | 2/2006 | Harris et al. .................. | 455/418 |
| 7,301,905 | B1 * | 11/2007 | Tontiruttananon et al. ... | 370/232 |
| 7,362,726 | B2 * | 4/2008 | Petrovic et al. ............... | 370/329 |
| 7,466,652 | B2 * | 12/2008 | Lau et al. .................... | 370/230.1 |
| 7,466,677 | B2 * | 12/2008 | Rasanen ....................... | 370/329 |
| 7,471,654 | B2 * | 12/2008 | Mueckenheim et al. ..... | 370/329 |
| 7,564,788 | B2 * | 7/2009 | Lundh et al. .................. | 370/232 |
| 7,587,203 | B2 * | 9/2009 | Shahidi et al. ................ | 455/423 |

(Continued)

OTHER PUBLICATIONS

Alcatel-Lucent; MME Overload Control by Throttling of DL Low Priority Traffic; 3GPP Draft; S2-105057 (was 4574) 23401 MTC DL CTL, 3rd Generation Partnership Project (3GPP), Mobile Competence Centre; 650, Route Des Lucioles; F-06921; Sophia-Antipolis Cedex; France, vol. SA WG2, No. Prague; 20101011, Oct. 13, 2010; XP050522506; [retrieved on Oct. 13, 2010].

(Continued)

*Primary Examiner* — Andrew Lai
*Assistant Examiner* — Andrew C Lee
(74) *Attorney, Agent, or Firm* — Carmen Patti Law Group, LLC (57) ABSTRACT

Exemplary methods and apparatuses are provided for throttling wireless traffic during congestion in radio access networks. Embodiments are provided that may assist service providers to reduce new requests for network resources during congestion and allow existing lower priority traffic to be pre-empted with a backoff time to allow a new request with higher priority traffic to be served. In response to a request for an additional connection to a radio access network from a terminal device that has one or more existing connections in the radio access network, an access network controller will compare a priority level of a requested connection to a priority level of other existing connections in the radio access network. The access network controller may reject or grant the request based on the comparison and send the terminal device a backoff time value and a congestion indicator.

24 Claims, 5 Drawing Sheets

(56) References Cited

U.S. PATENT DOCUMENTS

| | | | |
|---|---|---|---|
| 7,724,656 B2* | 5/2010 | Sågfors et al. | 370/229 |
| 7,889,646 B2* | 2/2011 | Wright | 370/230 |
| 7,940,734 B2* | 5/2011 | Park et al. | 370/338 |
| 7,945,255 B2* | 5/2011 | Harris et al. | 455/418 |
| 8,060,098 B2* | 11/2011 | Yang et al. | 455/439 |
| 8,081,974 B2* | 12/2011 | Fischer et al. | 455/434 |
| 8,155,074 B1* | 4/2012 | Vargantwar et al. | 370/330 |
| 8,233,462 B2* | 7/2012 | Walton et al. | 370/338 |
| 8,270,298 B2* | 9/2012 | Lundh et al. | 370/235 |
| 8,307,031 B1* | 11/2012 | Grieve | 709/203 |
| 8,320,397 B2* | 11/2012 | Desai et al. | 370/445 |
| 8,509,157 B2* | 8/2013 | Beziot et al. | 370/329 |
| 2003/0003919 A1* | 1/2003 | Beming et al. | 455/446 |
| 2003/0053480 A1* | 3/2003 | Jang et al. | 370/445 |
| 2003/0099197 A1* | 5/2003 | Yokota et al. | 370/230 |
| 2004/0081115 A1* | 4/2004 | Parsa et al. | 370/320 |
| 2004/0085909 A1* | 5/2004 | Soliman | 370/252 |
| 2004/0180677 A1* | 9/2004 | Harris et al. | 455/466 |
| 2005/0041584 A1* | 2/2005 | Lau et al. | 370/235 |
| 2005/0135284 A1* | 6/2005 | Nanda et al. | 370/294 |
| 2005/0163103 A1* | 7/2005 | Malomsoky et al. | 370/352 |
| 2005/0220097 A1* | 10/2005 | Swami et al. | 370/389 |
| 2005/0262266 A1* | 11/2005 | Wiberg et al. | 709/238 |
| 2006/0039450 A1* | 2/2006 | Fulton et al. | 375/133 |
| 2006/0079200 A1* | 4/2006 | Hirouchi et al. | 455/404.1 |
| 2006/0140115 A1* | 6/2006 | Timus et al. | 370/230 |
| 2007/0043558 A1* | 2/2007 | Schwarz et al. | 704/207 |
| 2007/0047570 A1* | 3/2007 | Benveniste | 370/448 |
| 2007/0076742 A1* | 4/2007 | Du et al. | 370/445 |
| 2007/0153695 A1* | 7/2007 | Gholmieh et al. | 370/235 |
| 2007/0195710 A1* | 8/2007 | Nakata | 370/254 |
| 2007/0264986 A1* | 11/2007 | Warrillow et al. | 455/414.3 |
| 2008/0089250 A1* | 4/2008 | Jung | 370/276 |
| 2008/0186862 A1* | 8/2008 | Corbett et al. | 370/237 |
| 2008/0198783 A1* | 8/2008 | Manos et al. | 370/310.1 |
| 2008/0225708 A1* | 9/2008 | Lange | 370/230 |
| 2008/0225857 A1* | 9/2008 | Lange | 370/395.5 |
| 2009/0067335 A1* | 3/2009 | Pelletier et al. | 370/238 |
| 2010/0002579 A1 | 1/2010 | Shi et al. | |
| 2010/0054135 A1* | 3/2010 | Rahman et al. | 370/242 |
| 2010/0135319 A1* | 6/2010 | Wang et al. | 370/445 |
| 2010/0172299 A1* | 7/2010 | Fischer et al. | 370/328 |
| 2010/0195503 A1* | 8/2010 | Raleigh | 370/235 |
| 2010/0240369 A1* | 9/2010 | Law et al. | 455/436 |
| 2010/0246423 A1* | 9/2010 | Wang | 370/252 |
| 2010/0311433 A1* | 12/2010 | Lindskog et al. | 455/450 |
| 2010/0323736 A1* | 12/2010 | Fischer et al. | 455/509 |
| 2011/0134890 A1* | 6/2011 | Fodor | 370/335 |
| 2011/0151885 A1* | 6/2011 | Buyukkoc et al. | 455/452.1 |
| 2011/0188379 A1* | 8/2011 | Calippe et al. | 370/241.1 |
| 2011/0199905 A1* | 8/2011 | Pinheiro et al. | 370/235 |
| 2011/0235559 A1* | 9/2011 | Sakoda | 370/310 |
| 2011/0249568 A1* | 10/2011 | Desai et al. | 370/242 |
| 2011/0263274 A1* | 10/2011 | Fox et al. | 455/456.2 |
| 2012/0094680 A1* | 4/2012 | Stackelius et al. | 455/452.1 |
| 2012/0106458 A1* | 5/2012 | Jang et al. | 370/328 |
| 2012/0163204 A1* | 6/2012 | Oprescu-Surcobe et al. | 370/252 |
| 2012/0163265 A1* | 6/2012 | Kotecha et al. | 370/312 |

OTHER PUBLICATIONS

Alcatel-Lucent; Mobility Management Congestion Control and Back-Off Timer; 3GPP Draft; C1-110890, 3rd Generation Partnership Project (3GPP), Mobile Competence Centre; 650, Route Des Lucioles; F-06921; Sophia-Antipolis Cedex; France, vol. CT WG1, No. Salt Lake City; 20110221, Feb. 13, 2011; XP050480307; [retrieved on Feb. 13, 2011].

* cited by examiner

MECHANISM FOR WIRELESS ACCESS NETWORKS TO THROTTLE TRAFFIC DURING CONGESTION

TECHNICAL FIELD

This invention relates to the art of telecommunication systems, and more particularly to messaging between wireless terminal devices and access network controllers during congestion.

BACKGROUND

Radio access networks carry traffic between an end user device, e.g., a mobile telephone, a laptop computer, etc., and the core/application network. Congestion occurs when traffic in the network exceeds the engineered radio access network capacity. Illustratively, radio access networks can become congested/overloaded when many end user devices use the access network simultaneously or when a few users with one or more different applications generate a large amount of data. Without radio access network control, the congestion may remain for long periods of time and could result in queuing delay, packet loss or the blocking of new connections. Desired congestion controls allow high priority traffic, e.g., emergency calls, and throttle lower priority traffic.

Disadvantageously, with the popularity of smart phones and the high use of applications that use the Internet in short bursts, data is being used in non-optimal ways for the wireless network, which stresses radio access network and core network resources. Illustratively, a user of a wireless device with one or more existing connections to the network may repeatedly request additional wireless network resources when the radio access network is in an overload condition.

SUMMARY

Apparatuses and methods are provided for throttling wireless traffic during congestion in radio access networks. Embodiments are provided that may assist network providers to reduce new requests for network resources during congestion and allow existing lower priority traffic to be pre-empted with a backoff time to allow a new request with higher priority traffic to be served.

More specifically, in one embodiment, provided is a method that includes receiving at an access network controller a request from a core network component to provide an additional connection to a mobile communications device that has one or more existing connections to the radio access network; determining at the access network controller that at least a portion of the radio access network is in an overload condition; and sending at the access network controller a first message to the core network component that comprises a congestion indicator and a time value during which congestion control is in effect.

In another embodiment, an apparatus includes a processor configured to compare a priority level of a connection requested by a mobile communications device having at least one existing connection in one of the one or more radio access networks to a priority level for connections in a set of one or more existing connections in the one of the one or more radio access networks, and configured to generate a first message when the comparison results in a determination that the priority level of the connection requested is not equal to the priority level of connections in the set of the one or more existing connections, wherein the first message comprises a congestion indicator and a time value during which congestion control is in effect; and a transmitter configured to send the first message to the core network component.

In another embodiment, a non-transitory computer-readable storage medium includes means for receiving a request from a core network component to provide an additional connection to a mobile communications device that has one or more existing connections to the radio access network; means for determining that at least a portion of the radio access network is in an overload condition; and means for sending a message to the core network component that comprises a congestion indicator and a time value during which congestion control is in effect.

In another embodiment, an apparatus includes a processor configured to generate, while having one or more connections to a radio access network, a first request to a core network for an additional connection to the radio access network, initialize a timer to a time value received in a response to the first request, wherein the time value represents a duration of time during which congestion control is in effect for an area impacted by congestion, and store a priority level under congestion control indicator received in the response to the first request; and a memory component associated with the processor for storing the time value of the timer and the priority level under congestion control indicator.

DESCRIPTION OF THE DRAWINGS

Some embodiments of apparatuses and methods in accordance with embodiments of the present invention are now described, by way of example only, and with reference to the accompanying drawings, in which.

DETAILED DESCRIPTION

Embodiments are provided that address how an access network controller may indicate to terminal devices to reduce new requests for network resources during congestion and allow existing lower priority traffic to be pre-empted with a backoff time, i.e., an amount of time required before a terminal device can initiate another request for network resources, to allow an existing higher priority connection or a new request with higher priority traffic to be served.

Figure 1:
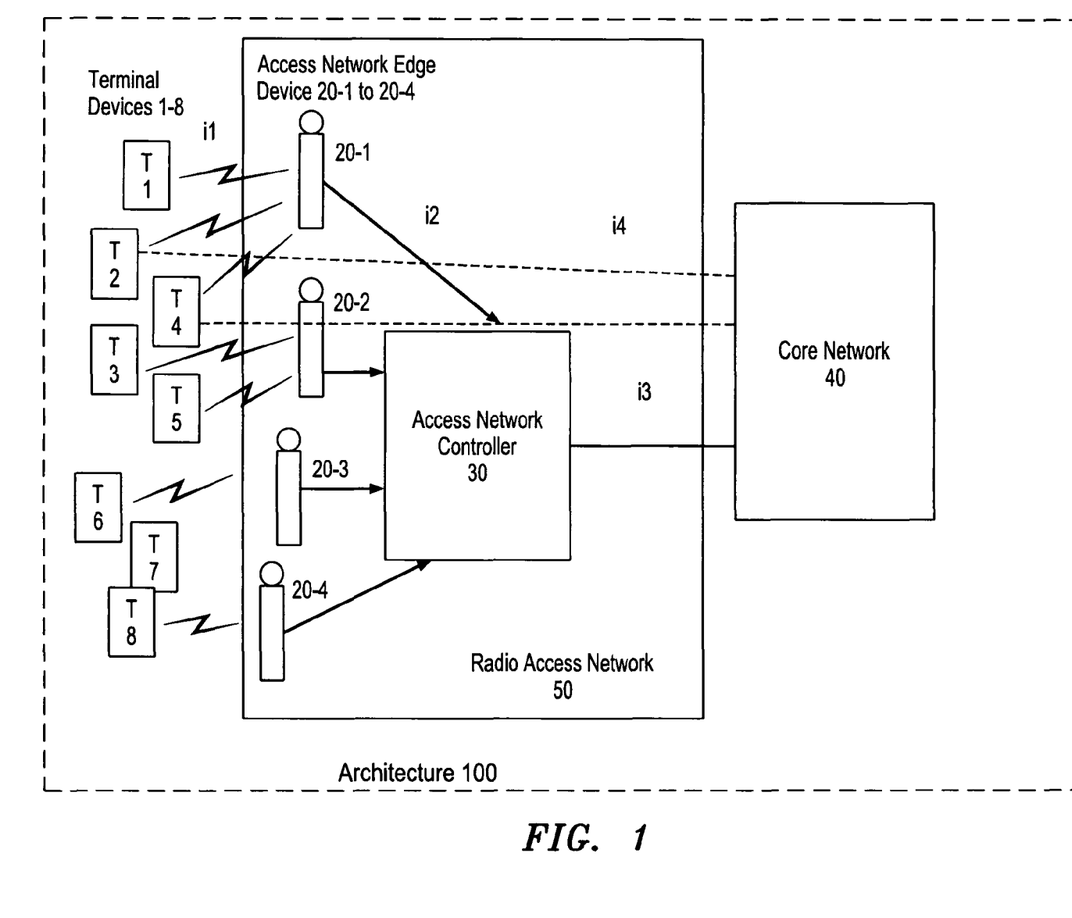
FIG. 1 shows an illustrative embodiment of an exemplary radio access network connected to a core network arranged in accordance with the principles of the invention.

FIG. 1 shows an illustrative embodiment of an exemplary radio access network connected to a core network arranged in accordance with the principles of the invention. As shown in FIG. 1, architecture 100 comprises Terminal devices 1-8 wirelessly connected to access network edge devices 20-1 to 20-4 (hereinafter referred to as access network edge devices 20). Access network edge devices 20 connect to Access Network Controller 30, which connects to Core Network 40. Access network edge devices 20 are located in radio access network 50. Although only one access network controller is shown, there may be a plurality of access network controllers which connect to a plurality of access network edge devices, which connect to a plurality of terminal devices. FIG. 1 is shown as representative of a portion of a telecommunications network in order to simplify the description of the present invention, while still presenting the subject matter so that it may be completely understood by one of ordinary skill in the art.

In one embodiment, Terminal devices 1-8 are small, lightweight portable mobile telephones, e.g., pocket telephones, used by service subscribers to initiate communications with networks, e.g., servers, and other subscribers. Terminal devices 1-8 are capable of wirelessly connecting to a communications network having wireless technology that allows a user of Terminal devices 1-8 to communicate, via a user interface on Terminal devices 1-8, with another party or services, not shown.

Terminal devices 1-8 may be capable of sending and receiving voice calls, email, short message service (SMS), images, video, microbrowser messages, text messaging, interacting with data services or any combination thereof. Terminal devices 1-8 connect to a communications network via one or more of different types of air interfaces that may include, but are not limited to Long Term Evolution (LTE)/Evolved UMTS Terrestrial Radio Access Network (E-UTRAN), Universal Mobile Telecommunications System (UMTS), Global System for Mobile Communications (GSM), Code Division Multiple Access (CDMA), Time Division Multiple Access (TDMA), Cellular Digital Packet Data (CDPD), Wireless Fidelity (Wi-Fi) based on IEEE 802.11 and Worldwide Interoperability for Microwave Access (Wi-Max) networks or any other standard or protocol which supports the delivery of voice calls, email, images, video, microbrowser messages, text messaging, and/or interacting with data services. Illustratively, I1, as shown in FIG. 1, is representative of the air interface between Terminal devices 1-8 and access edge devices 20. Also, Terminal devices 1-8 may be capable of loading Internet web pages, downloading files, e.g., music, and transferring files via communication with servers. Terminal devices 1-8 may be capable of multi-band operation, i.e., two radio access technologies. Terminal devices 1-8 may be operated in a given geographical area which may be a) a visiting area served by a visited wireless network, e.g., mobile switching center (MSC) or Internet Protocol (IP) based core network, into which a subscriber roams or b) the subscriber's home service area served by a home wireless network, e.g., MSC or IP based core network.

It will be readily understood that the method of the present invention is not limited to a mobile "pocket" telephone. In another embodiment of the invention, Terminal devices 1-8 may be mobile telephones installed in an engine-driven vehicle and supplied with current from the vehicle electrical system. In yet another embodiment of the invention, Terminal devices 1-8 may be smart phones, personal digital assistance (PDA) devices, a digital video camera that can access the Internet, two-way pagers, notebook computers, or wireless portable media players that allow an addition of executable programs, or other portable devices with the capability to connect and interact with a wireless network.

In one embodiment, access network edge devices 20 are base stations, i.e., radio transmitters/receivers, that provide bi-directional wireless connectivity for wireless communication devices, e.g., Terminal devices 1-8, within a geographical area, or a cell, i.e., a basic geographic unit of a cellular system, proximate to access network edge device 20. Access network edge devices 20 may produce a radiation pattern that defines a coverage area of the cell site. Access network edge devices 20 may use an air interface standard that is complementary to the air interface standard of Terminal devices 1-8 so that calls may be connected from Terminal devices 1-8 to a wireless network which connects to Core Network 40, which may connect the calls to a terminal endpoint. Terminal devices 1-8 may select one of access network edge devices 20 for communication with the network based on factors such as signal strength, signal integrity, and current load on access network edge devices 20.

Access network edge devices 20 may route broadcasted pages from the wireless network to Terminal devices 1-8 to alert Terminal devices 1-8 of incoming packets, a call or text messages. Access network edge devices 20 may be positioned at or near the center of each cell or, depending on geography and other known factors, access network edge device 20 may instead be located at or near the periphery of, or otherwise away from the center of, each cell. Access network edge devices 20, may be geographically dispersed to form an area of coverage for a specific mobile switching center. Access network edge devices 20, in one embodiment, comprise one or more LTE cells.

Access network edge devices 20 communicate with Core Network 40 via Access Network Controller 30. Access Network Controller 30 may perform management of radio resources, e.g., radio bearer control, radio admission control, etc., and may control a plurality of access network edge devices. Illustratively, Access Network Controller 30 controls the hand-off process, i.e., change of an active access network edge device serving a terminal device, of in-progress voice calls and/or data transmissions from one access network edge device to another. Access Network Controller 30 may have a wired connection, e.g., T1/E1 (1.5 to 2 Mbps) or higher bandwidth, IP, etc., to access network edge devices 20. Illustratively, I2, as shown in FIG. 1, is representative of a protocol that Access Network Controller 30 may use to communicate with access edge devices 20. The connections between Access Network Controller 30 and Core Network 40 may encompass optical links, wireless links, packet switched channels, direct communication channels, microwave, Ethernet or any combination thereof depending on the needed capacity and expense. Illustratively, I3, as shown in FIG. 1, is representative of a protocol that Access Network Controller 30 may use to communicate with Core Network 40, which may correspond to the S1 Application Protocol for LTE/E-UTRAN access type. Access Network Controller 30, in one embodiment, comprises one or more of a LTE e-NodeB.

Core Network 40 performs communication session set up and tear down, contains the network infrastructure used to convey calls or messages from the call originator to the terminating point, and controls how connections are made from the call originator to the terminating point. Core Network 40 is composed of interconnected network infrastructure, not shown, that may include a) wireless and wireline components capable of monitoring packet connections and routing calls between endpoints, e.g., packet switches, mobile switching centers, circuit switches, servers, routers, Mobility Management Entities (MMEs), Serving General Packet Radio Service (GPRS) Support Nodes (SGSNs), Packet Gateways (P-GW), Gateway GPRS Support Nodes (GGSNs), satellites, etc., b) signaling components for transmission of control signaling messages between network elements, terminal devices, etc., e.g., signaling system 7 (SS7) architecture, mobile application part (MAP), Transmission Control Protocol/Internet Protocol (TCP/IP), session initiation protocol (SIP), etc., c) transport components, e.g., fiber, copper, SONET systems, etc., d) storage components, e.g., databases, used to process service requests, store messages, as well as e) systems used to manage elements of Core Network 40 and to collect call details, e.g., billing systems, etc, as will be appreciated by those of ordinary skill in the art. The functions of the network infrastructure are well known in the art, and will not be described in detail.

For purposes of illustration and example, Terminal device 1 may have one or more existing connections to Core Network 40 via radio access network 50 for a communication session, e.g., a data connection. The user of Terminal device 1 may thereafter initiate a new request for an additional connection, e.g., a connection to the Internet to run a smart phone application, by transmitting a message to Core Network 40.

The request may be sent in a core network message, e.g., an I4 protocol as shown in FIG. 1 that may correspond to the Non-Access Stratum (NAS) protocol for LTE/E-UTRAN access type. Access network edge device 20-1 may not perform processing on the contents of the core network message. Access network edge device 20-1 simply forwards the request to a component of Core Network 40, e.g., a MME, a mobile switching center, a SGSN, etc. Thus, access network edge device 20-1 will not be able to throttle, i.e., reject, the request because Terminal device 1 is already connected to radio access network 50. Core Network 40, which is not in an overload condition, may allocate the core network resources needed to fulfill the request. Core Network 40 then sends a message to Access Network Controller 30 that contains Terminal device 1's request for the new connection, e.g., to the Internet. Illustratively, Core Network 40's message to Access Network Controller 30 may be a setup request to establish additional radio access bearers for LTE/E-UTRAN. Also, for LTE/E-UTRAN, the request comes over the existing S1 Application Protocol connection between Access Network Controller 30 and Core Network 40, so Access Network Controller 30 knows the identity, e.g., via an identifier, of the originator of the request, i.e., Terminal device 1.

Access Network Controller 30 monitors radio access network 50 and determines that a portion of radio access network 50, e.g., access network edge device 20-1, is in an overload condition, i.e., congested. Illustratively, an access network edge device may become overloaded when it exhausts its bandwidth capability on the radio bearers. A congested access network edge device may send a message to Access Network Controller 30 indicating the existence of congestion, possibly also including an indicator of the type of congestion it is experiencing. Also illustratively, Access Network Controller 30 knows that it is overloaded when it cannot handle any job requests and spends its time thrashing, i.e., trying to allocate internal resources and never being able to actually process the requests. In such a circumstance, Access Network Controller 30 may take action to relieve the congestion by throttling requests for new resources on the congested edge entity, i.e., access network edge device 20-1.

After receiving the message from Core Network 40 containing Terminal device 1's request, Access Network Controller 30 determines that Terminal device 1's request for the additional connection cannot be fulfilled at that time. Also, Access Network Controller 30 may have one or more processors which execute program logic to retrieve records from a storage device. The one or more processors may employ an identifier of Terminal device 1 to obtain the records of Terminal device 1's bandwidth allocation and a priority level for Terminal device 1's one or more existing connections from the storage device. Priority level in LTE/E-UTRAN defines the relative importance of requested resources, and is used to decide if a bearer establishment/modification request can be accepted or rejected in case of resource limitations. Illustratively, the range of the allocation and retention priority (ARP) priority level in LTE/E-UTRAN is 1 to 15, where a priority level of 15 has the lowest priority and a priority level of 1 has the highest priority. Access Network Controller 30 obtains the priority level of the newly requested connection from the request message.

After retrieving the records, Access Network Controller 30 may compare a priority level of the newly requested connection to the priority level of Terminal device 1's one or more existing data connections. Also illustratively, in LTE/E-UTRAN, the comparison could be between the priority level of the newly requested connection and the priority level of other existing connections in radio access network 50 regardless of the device's identity. If the priority level of the newly requested connection is lower than Terminal device 1's one or more existing data connections and the priority level of other existing data connections in radio access network 50, then Access Network Controller 30 will reject the request since it is a lower priority than the currently allocated data connections. Note that if the priority level of the newly requested connection is the same as the priority level of Terminal device 1's one or more existing data connections or the priority level of other existing data connections in radio access network 50, then there are no lower priority bearers that can be pre-empted and there are no additional resources available. The request for the new connection will again be rejected.

Access Network Controller 30 may send a message to Core Network 40 to indicate that the request is rejected because radio access network 50 is in an overload condition, (i.e., a congestion indicator) in conjunction with an indicator of the highest priority level under congestion control and the area/location of the overload. Illustratively, this message may be representative of a setup response to the setup request to establish additional radio access bearers for LTE/E-UTRAN. Information used to identify the area of the overload may include, but is not limited to, the number of cell sites impacted, a location of the cells represented by a global position represented by at least two coordinates, e.g., latitude and longitude, a base station identification code, a location/routing/tracking area code, a system identification, a network identification and a MacroCell identity, or any combination thereof. If an area impacted is not included, then it may be determined by default to be the current serving cell. In addition, the message includes a backoff time value, i.e., an amount of time required before a terminal can initiate another request for network resources, so that Terminal device 1 does not request the resources repeatedly. The backoff time may have a predetermined value, e.g., at least 10 seconds, or the backoff time may vary per requested connection.

After receiving the message from Access Network Controller 30, Core Network 40 may release the resources that were allocated for the requested connection. Also, Core Network 40 may send a message (e.g., an I4 response shown in FIG. 1) to Terminal device 1 to indicate one or more of the rejection of request, the congestion indicator, the priority level under congestion control indicator, the identifier of the area impacted by the congestion, and the backoff time value received from Access Network Controller 30 which indicate that additional requests should not be made until the backoff timer expires or until Terminal device 1 moves outside of the area impacted, or Terminal device 1 has a new connection request with a higher priority than the highest priority level under congestion control.

After receiving the message from Core Network 40 indicating a rejection of the request, Terminal device 1 starts a timer initialized with the backoff time value. Terminal device 1 will not initiate signaling messages to the impacted radio access network, i.e., access network edge device 20-1, or to Core Network 40 to request data connections of this priority level (i.e., the priority level under congestion control) or lower priority until the timer has expired or Terminal device 1 moves outside of the area impacted. However, Terminal device 1 may initiate requests for data connections of a higher priority than the requested connection while the timer is active, i.e., the time has a non-zero value. After the timer expires or Terminal device 1 moves outside of the area impacted or Terminal device 1 has a higher priority connection to request, then Terminal device 1 may initiate another request for the additional connection.

Alternatively, if the priority level of the requested connection is higher than the priority levels of Terminal device 1's one or more existing data connections or the priority levels of any other connected device's existing data connection that is pre-emptable, then Access Network Controller 30 may pre-empt (i.e., terminate) one of the existing data connections to allow the request for the higher priority connection. In other words, Access Network Controller 30 releases a lower priority pre-emptable bearer that may be either one of Terminal device 1's one or more existing data connections or one of the lower priority other existing data connections in radio access network 50, and grants the requested connection. The requested new connection is assigned to the bearer that was pre-empted, thus activating the request for the new connection. Access Network Controller 30 sends a message to Core Network 40 to indicate that the request for the new connection has been granted, but one or more lower priority pre-emptable bearers have been released. In addition, the message may include one or more of the congestion indicator, the priority level under congestion control indicator, the backoff time value and an identifier of the area impacted so that Terminal device 1 will not repeatedly request the lower priority existing data connection.

After receiving the message from Access Network Controller 30, Core Network 40 sends a message to Terminal device 1 to indicate that the request for the new connection has been granted, but a lower priority pre-emptable bearer has been released. Also, the message may include one or more of the congestion indicator, the identifier of the area impacted, the priority level under congestion control indicator and the backoff time value so that Terminal device 1 knows that an overload condition exists and Terminal device 1 should not attempt to re-establish its pre-empted data connection or a new connection that has a priority level less than or equal to the pre-empted connection until the backoff timer has expired or Terminal device 1 has moved outside of the area impacted. Then, Core Network 40 may release the resources associated with the pre-empted data connection.

As stated previously, Access Network Controller 30 may pre-empt one of the lower priority other existing data connections in radio access network 50, e.g., Access Network Controller 30 releases a bearer of Terminal device 2 rather than one of Terminal device 1's one or more existing data connections. In this embodiment, Access Network Controller 30 sends a second message to Core Network 40 to indicate one or more of the identity of the terminal device with the pre-empted connection, the identity of the bearer that was pre-empted in conjunction with the congestion indicator, the identifier of the area impacted, the priority level under congestion control indicator and the backoff time value. In other words, one message is sent per terminal device impacted. Core Network 40 may release the resources associated with the pre-empted data connection and send a message to Terminal device 2 that indicates one or more of an indicator of the bearer that was released, the congestion indicator, the identifier of the area impacted, the priority level under congestion control indicator and the backoff time value.

After receiving the message from Core Network 40, Terminal device 1 starts a timer initialized with the backoff time value. Terminal device 1 will not initiate signaling messages to the impacted radio access network (i.e., access network edge device 20-1) or to Core Network 40 to request the pre-empted data connection until the timer has expired or Terminal device 1 has moved outside of the area impacted (assuming one of Terminal device 1's one or more existing data connections was pre-empted). After the timer expires or Terminal device 1 moves outside of the area impacted, then Terminal device 1 may initiate another request for the pre-empted data connection.

In another embodiment, after receiving the message from Core Network 40 that Terminal device 1 requests the new connection, Access Network Controller 30 may determine that, instead of access network edge device 20-1 which provides radio access to Terminal device 1 being overloaded, all or a substantial portion of radio access network 50 is overloaded. In this embodiment, Access Network Controller 30 may throttle requests until the congestion is relieved, and devices that were rejected (e.g., Terminal device 1) would not be able to initiate a new request for connections for the specified priority while in the area specified by Access Network Controller 30. Access Network Controller 30 may send a message to Core Network 40 to indicate that the request for the new connection is rejected because radio access network 50 is in an overload condition, in conjunction with the priority level of the rejected connection and information that identifies the specific area of the overload, e.g., a location of the cell sites represented by a global position represented by at least two coordinates, e.g., latitude and longitude, a location area code and a MacroCell identity, etc., or any combination thereof. In addition, the message may include a congestion indicator and a backoff time value so that Terminal device 1 does not request the resources repeatedly.

After receiving the message from Access Network Controller 30, Core Network 40 releases the resources that were allocated for the requested new connection. Also, Core Network 40 sends a message to Terminal device 1 that contains an indication that the request will not be granted, and one or more of the congestion indicator, the priority level under congestion control indicator, an identifier of area impacted and the backoff time value (e.g., an indication that additional requests should not be made until the backoff time value has expired or until Terminal device 1 leaves the affected area).

After receiving the message from Core Network 40, Terminal device 1 starts a timer initialized with the backoff time value. Terminal device 1 will not initiate signaling messages to the impacted radio access network, i.e., access network edge device 20-1, or to Core Network 40 to request a new connection until the timer has expired or until Terminal device 1 moves outside of the area impacted or Terminal device 1 has a higher priority connection to request. After the timer expires or Terminal device 1 moves outside of the area impacted or Terminal device 1 has a higher priority connection to request, then Terminal device 1 may initiate another request for the new connection.

Figure 2:
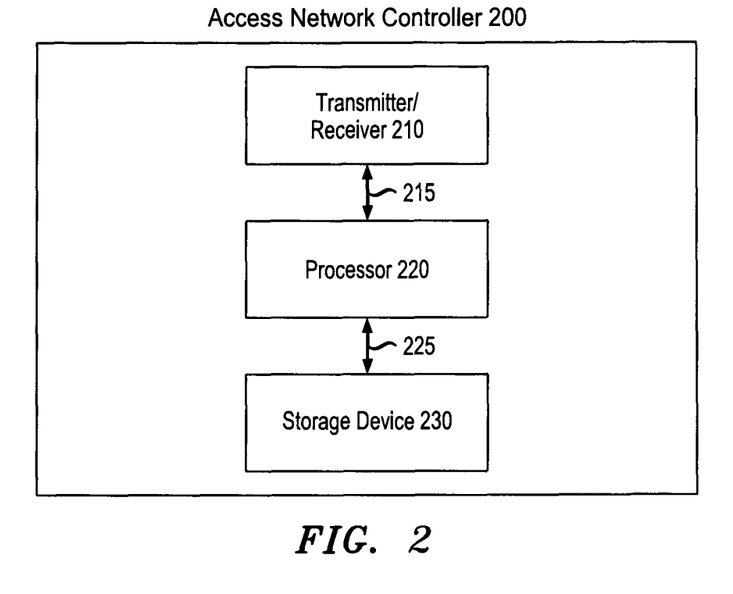
FIG. 2 shows an illustrative embodiment for an exemplary access network controller arranged in accordance with the principles of the invention.

FIG. 2 shows an illustrative embodiment for an exemplary access network controller arranged in accordance with the principles of the invention. As shown in FIG. 2, Access Network Controller 200 comprises Processor 220 which connects to Storage Device 230 and to Transmitter/Receiver 210.

Processor 220 receives and processes instructional information to perform functions necessary for Access Network Controller 200 to manage radio access network 50. Specifically, Processor 220 monitors radio access network 50 to determine whether an overload condition exists and throttles wireless traffic during congestion in radio access network 50. More specifically, after receiving a request for an additional connection initiated by a terminal device that has one or more existing connections in radio access network 50 during an overload condition in radio access network 50, Processor 220 retrieves at least one record of the existing connections in radio access network 50 from Storage Device 230 via link 225. Processor 220 extracts a priority level of the requested additional connection from the request message and Processor 220 obtains a priority level of the existing connections from the retrieved at least one record. Next, Processor 220 compares the priority level of the requested additional connection to the priority level of the existing connections.

Processor 220 generates a message that has either a grant or a rejection indicator based on an outcome of the comparison. Processor 220 generates a message with a rejection indicator when the priority level of the requested additional connection is lower than or equal to the priority level of the existing connections. The message with the rejection indicator may also include one or more of a backoff time value, a congestion indicator, a priority level under congestion control indicator and an identifier of the area impacted. During congestion, Processor 220 generates a message with a grant indicator when the priority level of the requested additional connection is higher than the priority level of the existing connection in conjunction with an indicator of a release of a lower priority pre-emptable bearer. The message with the grant indicator may also include one or more a backoff time value, a congestion indicator, a priority level under congestion control indicator and an identifier of the area impacted. If none of the terminal device's assigned bearers have a lower priority pre-emptable bearer, then Processor 220 may pre-empt a lower priority connection/bearer of another (i.e., different) terminal device connected to radio access network 50. Also, Processor 220 generates a message with a grant indicator when the mobile communications device is not in the area impacted by the congestion.

Processor 220 may be any type of processor capable of manipulating data and performing the functions described herein for Access Network Controller 30. Processor 220 should not be construed to refer exclusively to hardware capable of executing software, and may implicitly include, without limitation, digital signal processor (DSP) hardware, application specific integrated circuit (ASIC), field programmable gate array (FPGA), read only memory (ROM) for storing software, random access memory (RAM) for storing software, and non volatile storage. The functions of Processor 220 may be provided by a single dedicated processor, by a single shared processor, or by a plurality of individual processors, some of which may be shared.

Storage device 230 contains memory locations for storing information, such as records on the number of existing connections, and the bandwidth allocations and priority levels of the existing connections and available resources in radio access network 50. The records for a specific Terminal device are held in Access Network Controller 30 for as long as the Terminal device is known in radio access network 50.

Transmitter/Receiver 210 are devices that may be used to access particular types of network elements with which Access Network Controller 200 wishes to communicate. Illustratively, Transmitter/Receiver 210 receives signaling messages from access edge devices 20 and Core Network 40 and forwards them to Processor 220 via link 215. Also illustratively, Transmitter/Receiver 210 sends signaling messages generated by Processor 220 to access edge devices 20 and Core Network 40.

Figure 3:
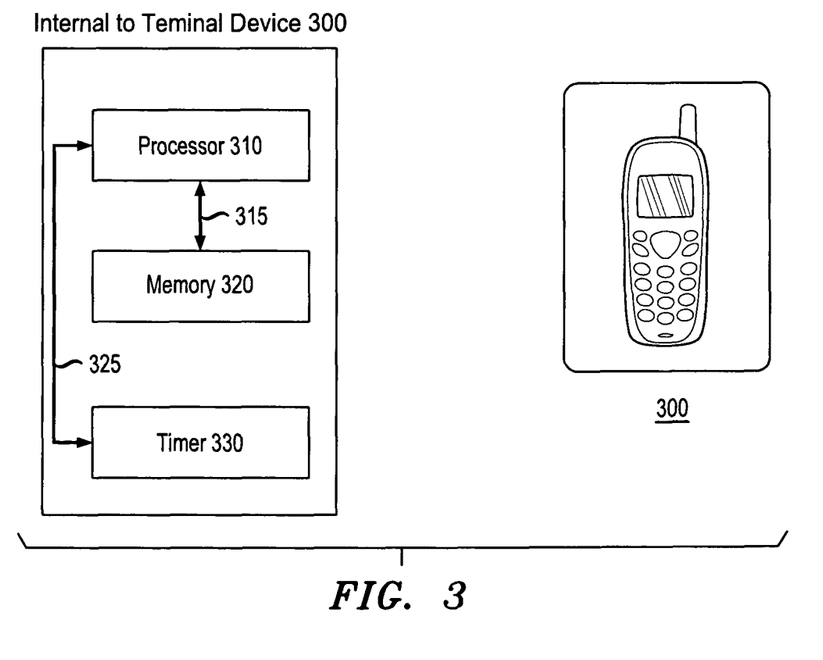
FIG. 3 shows an illustrative embodiment for a terminal device arranged in accordance with the principles of the invention.

FIG. 3 shows an illustrative embodiment for a terminal device arranged in accordance with the principles of the invention. As shown in FIG. 3, Terminal device 300 comprises Processor 310 which connects to Memory 320 and to Timer 330.

The user interface of Terminal device 300 may include an audio interface (e.g., microphone and speakers), a visual interface (e.g., a display), a user input interface (e.g., a keyboard, a touch pad, or a pointing device (e.g., a navigation key set)), or some combination thereof.

Processor 310 controls the operations of Terminal device 300 and provides an interface between the user input interface, audio interface and visual interface. A user of Terminal device 300 may enter instructional information, such as a telephone number, for example, by pushing the buttons of the keyboard, by voice activation using the microphone or by pressing a touch pad. Processor 310 receives and processes the instructional information to perform the appropriate function, such as to dial a telephone number or connect to an Internet site. Processor 310 issues instructional information to a transmitter, not shown, to initiate communications. An antenna of Terminal device 300 facilitates the transmission and reception of radio frequency signals to a network.

Timer 330 provides, when initialized with a backoff time value, a waiting time during which Terminal device 300 must delay requests for network resources. More specifically, when Terminal device 300 has one or more existing connections to a radio access network and Processor 310 generates a request for an additional connection that is sent via the transmitter to the core network, Terminal device 300 may receive a message in response from the core network that contains either an indicator of a grant or a rejection of the request in conjunction with one or more of the backoff time value, a congestion indicator, an indicator of the area impacted, and an indicator of the priority level under congestion control. Also, the message may contain an indicator of a release of a lower priority pre-emptable bearer if the request was granted. Processor 310 executes program logic to extract the received backoff time value, congestion indicator, and indicators of priority level under control and area impacted from the message and to store the received backoff time value, congestion indicator, and indicators of priority level under control and area impacted in Memory 320. Next, Processor 310 initializes Timer 330 to the backoff time value via bus 325 to start Timer 330. Timer 330 may now limit Terminal device 300's ability to initiate signaling messages to the impacted radio access network to request network resources until Timer 330 has expired or Terminal device 300 moves outside of the area impacted or Terminal device 300 has a higher priority connection to request. When Terminal device 300 moves outside of the area impacted, Processor 310 may clear Timer 330 and generate a message to be sent to the core network to request the additional connection.

Memory 320 is used for storing instructions for the operation of Processor 310 and also for storing the data used by Processor 310 in executing those instructions. A bus 315 is used for the exchange of information between Memory 320 and Processor 310.

Advantageously, the methods according to the invention enable service providers to reduce terminal device initiated signaling load during radio access network overload. Also advantageously, the exemplary embodiments provide a technique for users of terminal devices to possibly obtain desired connections when the radio access network is in an overload condition.

Figure 4:
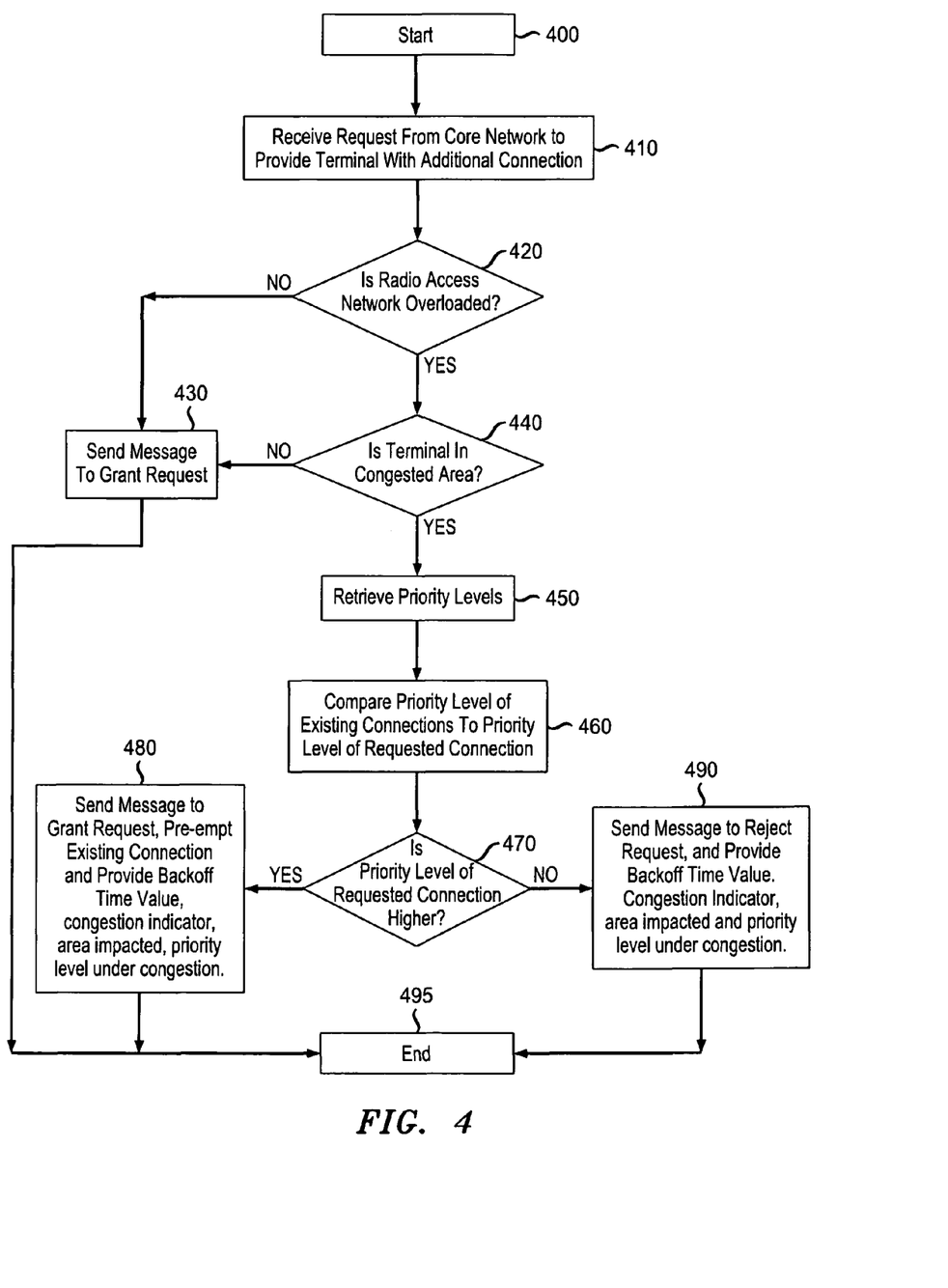
FIG. 4 shows an illustrative flow chart for an exemplary method of operating an embodiment of the invention arranged in accordance with the principles of the invention.

FIG. 4 shows an illustrative flow chart for an exemplary method of operating an embodiment of the invention arranged in accordance with the principles of the invention. FIG. 4 focuses on the operation of Access Network Controller 30. The process begins in step 400 (FIG. 4).

In step 410 (FIG. 4), Receiver 210 (FIG. 2) receives a request from a component in Core Network 40 (FIG. 1) via a S1 Application Protocol to provide an additional connection to a mobile communications device, e.g., Terminal device 1, that has one or more existing connections to radio access network 50 managed by Access Network Controller 30.

In step 420 (FIG. 4), Processor 220 (FIG. 2) determines whether at least one portion of radio access network 50, e.g., access edge device 20-1 (FIG. 1), accessed by Terminal device 1 is in an overload condition.

If the test result in conditional branch point 420 (FIG. 4) is NO, indicating that the at least one portion of radio access network 50 accessed by Terminal device 1 (FIG. 1) is not in an overload condition, then control is passed to step 430. In step 430 (FIG. 4), Transmitter 210 (FIG. 2) sends a message via the S1 Application Protocol to Core Network 40 (FIG. 1) to grant the request. Then, control is passed to step 495 (FIG. 4).

If the test result in step 420 (FIG. 4) is YES, indicating that the portion of radio access network 50 accessed by Terminal device 1 (FIG. 1) is in an overload condition, then control is passed to step 440.

In step 440 (FIG. 4), Processor 220 (FIG. 2) determines whether Terminal device 1 (FIG. 1) is in the congested portion of radio access network 50.

If the test result in conditional branch point 440 (FIG. 4) is NO, indicating that Terminal device 1 (FIG. 1) is not in the congested portion of radio access network 50, then control is passed to step 430 (FIG. 4). In step 430, Transmitter 210 (FIG. 2) sends a message via the S1 Application Protocol to Core Network 40 (FIG. 1) to grant the request. Then, control is passed to step 495.

If the test result in step 440 (FIG. 4) is YES, indicating that Terminal device 1 (FIG. 1) is in the congested portion of radio access network 50, then control is passed to step 450.

In step 450 (FIG. 4), Processor 220 (FIG. 2) retrieves at least one record of the priority level of the existing connections in radio access network 50 (FIG. 1) from Storage Device 230 (FIG. 2). Processor 220 extracts the priority level of the requested additional connection from the request message.

In step 460 (FIG. 4), Processor 220 (FIG. 2) compares a priority level of the requested additional connection to a priority level of the existing connections in radio access network 50 (FIG. 1).

In step 470 (FIG. 4), Processor 220 (FIG. 2) determines whether the priority level of the requested additional connection is higher than the priority level of the existing connections.

If the test result in step 470 (FIG. 4) is YES, indicating that the priority level of the requested additional connection is higher than the priority level of the existing connections, then control is passed to step 480.

In step 480 (FIG. 4), Transmitter 210 (FIG. 2) sends a message with a grant indicator for the request to Core Network 40 (FIG. 1) via the S1 Application Protocol in conjunction with an indicator of a release of a lower priority pre-emptable bearer. In one embodiment, pre-emption may be limited to pre-empt only an existing connection of the new connection requesting terminal device (i.e., Terminal device 1). In another embodiment, an existing connection of any terminal device with a lower priority pre-emptable bearer in radio access network 50 may be pre-empted. Also, the message may include one or more of a backoff time value, a congestion indicator, a priority level under congestion control indicator and an indicator of the area impacted. Then, control is passed to step 495.

If the test result in step 470 (FIG. 4) is NO, indicating the priority level of the requested connection is not higher than the priority level of the existing connections, then control is passed to step 490.

In step 490 (FIG. 4), Transmitter 210 (FIG. 2) sends a message with a rejection indicator for the request to Core Network 40 (FIG. 1) via the S1 Application Protocol. Also, the message may include one or more of a backoff time value, a congestion indicator, a priority level under congestion control indicator and an indicator of the area impacted. Then, control is passed to step 495 (FIG. 4).

The process is exited in step 495.

Figure 5:
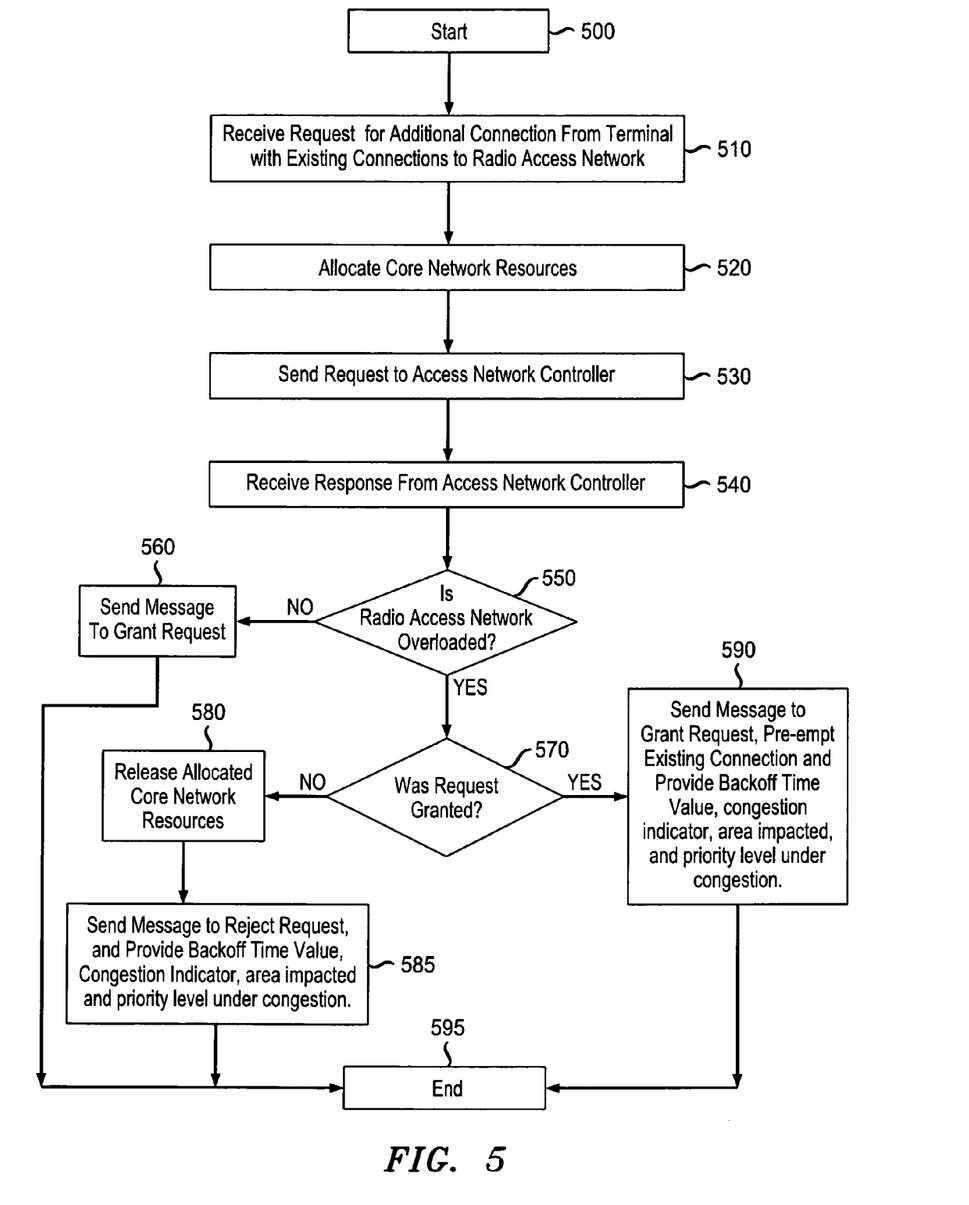
FIG. 5 shows another illustrative flow chart for an exemplary method of operating an embodiment of the invention arranged in accordance with the principles of the invention.

FIG. 5 shows another illustrative flow chart for an exemplary method of operating an embodiment of the invention arranged in accordance with the principles of the invention. FIG. 5 focuses on the operation of Core Network 40. The process begins in step 500 (FIG. 5).

In step 510 (FIG. 5), Core Network 40 (FIG. 1) receives a request from a mobile communications device (e.g., Terminal device 1) that has one or more existing connections to radio access network 50 managed by Access Network Controller 30, for an additional connection.

In step 520 (FIG. 5), Core Network 40 (FIG. 1) allocates core network resources for the request since the core network is not congested.

In step 530 (FIG. 5), Core Network 40 (FIG. 1) sends the request, including the priority level of the requested connection, to Access Network Controller 30 via a S1 Application Protocol.

In step 540 (FIG. 5), Core Network 40 (FIG. 1) receives a response from Access Network Controller 30 via the S1 Application Protocol.

In step 550 (FIG. 5), Core Network 40 (FIG. 1) determines whether the response indicates that radio access network 50 is congested.

If the test result in step 550 (FIG. 5) is NO, indicating that radio access network 50 is not congested, then control is passed to step 560.

In step 560 (FIG. 5), Core Network 40 (FIG. 1) sends a message with a grant indicator for the request to Terminal device 1 via a Non-Access Stratum protocol. Then, control is passed to step 595.

If the test result in step 550 (FIG. 5) is YES, indicating that radio access network 50 (FIG. 1) is congested, then control is passed to step 570.

In step 570 (FIG. 5), Core Network 40 (FIG. 1) determines whether the response indicates that the request is granted even though radio access network 50 is congested.

If the test result in step 570 (FIG. 5) is NO, indicating that the request was not granted because radio access network 50 (FIG. 1) is congested, then control is passed to step 580.

In step 580 (FIG. 5), Core Network 40 (FIG. 1) releases the core network resources allocated for the request.

In step 585 (FIG. 5), Core Network 40 (FIG. 1) sends a message to Terminal device 1 via the Non-Access Stratum protocol that contains a rejection indicator for the request, and may also contain one or more of a backoff time value, a congestion indicator, a priority level under congestion control indicator and an identifier of the area impacted. Then, control is passed to step 595.

If the test result in step 570 (FIG. 5) is YES, indicating that the request was granted even though radio access network 50 (FIG. 1) is congested, then control is passed to step 590.

In step 590 (FIG. 5), Core Network 40 (FIG. 1) sends a message to Terminal device 1 via the Non-Access Stratum protocol that contains a grant indicator for the request in conjunction with an indicator of a release of a lower priority pre-emptable bearer. The message may also contain one or more of a congestion indicator, a priority level under congestion control indicator and an identifier of the area impacted. Then, control is passed to step 595 (FIG. 5).

The process is exited in step 595.

Figure 6:
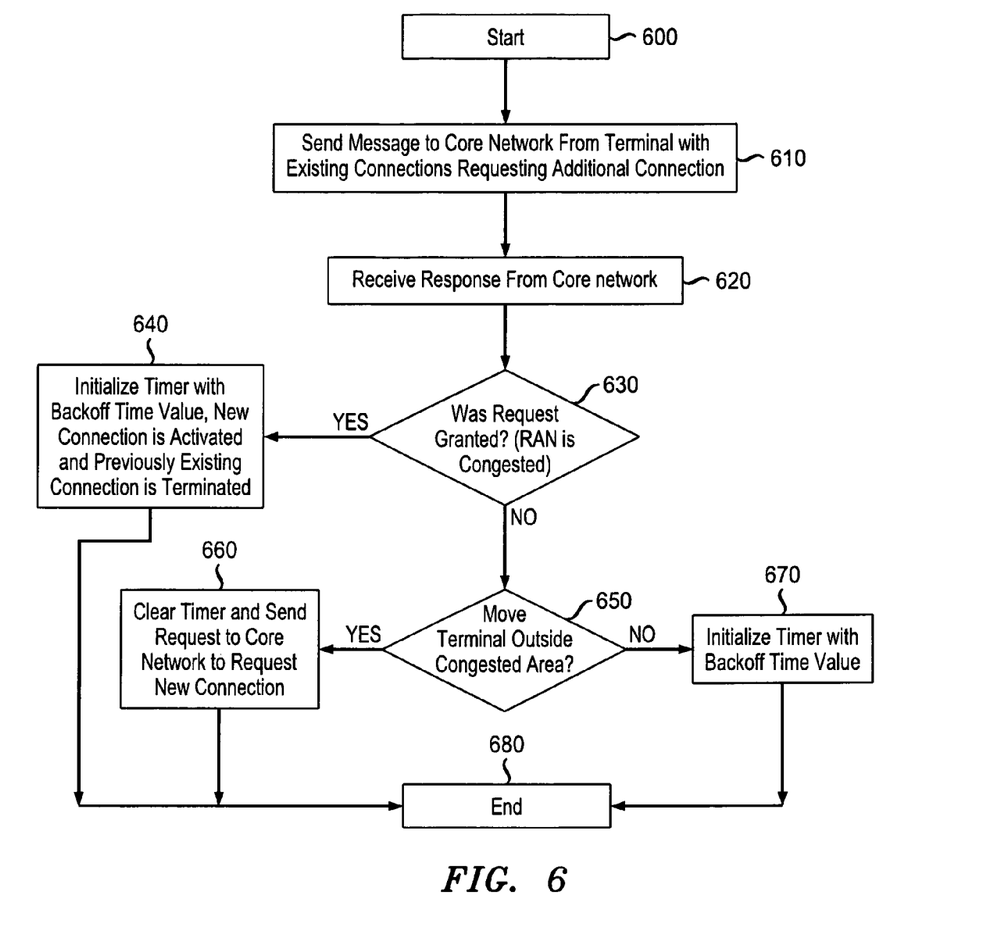
FIG. 6 shows yet another illustrative flow chart for an exemplary method of operating an embodiment of the invention arranged in accordance with the principles of the invention.

FIG. 6 shows yet another illustrative flow chart for an exemplary method of operating an embodiment of the invention arranged in accordance with the principles of the invention. FIG. 6 focuses on the operation of Terminal device 1. The process begins in step 600 (FIG. 6).

In step 610 (FIG. 6), Terminal device 1 (FIG. 1), which has one or more existing connections to radio access network 50 managed by Access Network Controller 30, sends a request to Core Network 40 for an additional connection.

In step 620 (FIG. 6), Terminal device 1 (FIG. 1) receives a response from Core Network 40 via the Non-Access Stratum protocol.

In step 630 (FIG. 6), Processor 310 (FIG. 3) determines whether the request was granted. Note that it is assumed radio access network 50 is congested in the interest of describing principles of the invention. If radio access network 50 is not congested, additional bearers are added as requested.

If the test result in step 630 (FIG. 6) is YES, indicating that the request was granted when radio access network 50 (FIG. 1) is congested, then control is passed to step 640. Note that this means that the priority level of the requested additional connection is higher than the priority level of one of the existing connections in radio access network 50.

In step 640 (FIG. 6), Processor 310 (FIG. 3) executes program logic to extract a received backoff time value, a congestion indicator, a priority level under congestion control indicator and an identifier of the area impacted from the response and to store the received backoff time value, congestion indicator, priority level under congestion control indicator and identifier of the area impacted in Memory 320. Also, Processor 310 executes program logic to initialize Timer 330 (FIG. 3) with the backoff time value to start Timer 330. Note that Access Network Controller 30 (FIG. 1) has released a lower priority pre-emptable bearer, which may be one of Terminal device 1's previously existing connections or one of the lower priority existing data connections of another terminal device connected to radio access network 50. The requested new connection has been assigned to the bearer that was pre-empted, thus activating the request for the new connection. Then, control is passed to step 680.

If the test result in step 630 (FIG. 6) is NO, indicating that the request was not granted because radio access network 50 (FIG. 1) is congested, then control is passed to step 650. Note that this means that the priority level of the requested additional connection is lower than the priority level of one of the existing connections in radio access network 50.

In step 650 (FIG. 6), Terminal device 1 (FIG. 1) determines whether Terminal device 1 has moved from the congested area.

If the test result in step 650 (FIG. 6) is YES, indicating that Terminal device 1 (FIG. 1) has moved from the congested area, then control is passed to step 660. In step 660 (FIG. 6), Processor 310 (FIG. 3) executes program logic to clear Timer 330 and to send a message to Core Network 40 (FIG. 1) to request the additional connection. Then, control is passed to step 680.

If the test result in step 650 (FIG. 6) is NO, indicating that Terminal device 1 (FIG. 1) has not moved from the congested area, then control is passed to step 670.

In step 670 (FIG. 6), Processor 310 (FIG. 3) executes program logic to extract a received backoff time value, a congestion indicator, a priority level under congestion control indicator and an identifier of the area impacted from the response and to store the received backoff time value, congestion indicator, priority level under congestion control indicator and identifier of the area impacted in Memory 320. Also, Processor 320 executes program logic to initialize Timer 330 with the backoff time value to start Timer 330. After Timer 330 expires, Processor 310 may initiate a new request for the additional connection. Also, if Processor 310 detects a new connection request with a priority level higher than the priority level under congestion control indicator, Processor 310 may initiate a new request for the additional connection. Then, control is passed to step 680 (FIG. 6).

The process is exited in step 680.

A person of ordinary skill in the art would readily recognize that steps of various above-described methods can be performed by programmed computers. Herein, some embodiments are intended to cover program storage devices, e.g., digital data storage media, which are machine or computer-readable and encode machine-executable or computer-executable programs of instructions where said instructions perform some or all of the steps of methods described herein. The program storage devices may be digital memories, magnetic storage media such as magnetic disks or tapes, hard drives, or optically readable digital data storage media. The embodiments are also intended to cover computers programmed to perform said steps of methods described herein.

The steps or operations described herein are intended as examples. There may be many variations to these steps or operations without departing from the spirit of the invention. For instance, the steps may be performed in a different order, or steps may be added, deleted, or modified.

The present invention may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The foregoing merely illustrates the embodiments of the invention. It will thus be appreciated that those skilled in the art will be able to devise various arrangements, which, although not explicitly described or shown herein, embody the principles of the invention, and are included within its spirit and scope.

What is claimed:

1. A method comprising:
   receiving at an access network controller a request from a core network component to provide an additional connection to a mobile communications device that has one or more existing connections to a radio access network managed by the access network controller;
   determining at the access network controller whether at least a portion of the radio access network is in an overload condition; and
   sending at the access network controller a first message to the core network component, the first message comprising a time value that specifies an amount of time required before the mobile communications device can initiate another request for network resources.

2. The method of claim 1 further comprising generating the first message when a difference exists between a priority level of the requested additional connection and a priority level of existing connections in the radio access network.

3. The method of claim 2 wherein the generating the first message when a difference exists between the priority level of the requested additional connection and the priority level of the existing connections in the radio access network comprises:
retrieving a record of the priority level of at least one existing connection in the radio access network;
extracting the priority level of the requested additional connection from the request;
comparing the priority level of the requested additional connection to the priority level of the at least one existing connection in the radio access network; and
generating the first message to comprise a grant or a rejection indicator based on an outcome of the comparison.

4. The method of claim 3 wherein the first message comprises a rejection of the request when the priority level of the requested additional connection is lower than the priority level of the at least one existing connection in the radio access network.

5. The method of claim 3 wherein the first message comprises a grant of the request and a release of a lower priority pre-emptable bearer of the mobile communications device when the priority level of the requested additional connection is higher than the priority level of one of the one or more existing connections of the mobile communications device.

6. The method of claim 5 further comprising assigning the requested additional connection to the pre-empted bearer to activate the requested additional connection.

7. The method of claim 2 further comprising sending at the access network controller a second message to the core network component that comprises the time value and a release of a lower priority pre-emptable bearer of another mobile communications device when the priority level of the requested additional connection is higher than the priority level of at least one existing connection of the another mobile communications device in the radio access network.

8. The method of claim 2, wherein the priority level ranges from the lowest priority level value to a highest priority level value, and wherein the priority level is used to determine when a bearer establishment or modification request can be accepted or rejected in cases of resources limitations.

9. The method of claim 1 wherein the first message comprises a grant of the request when the mobile communications device is not in an area impacted by congestion.

10. The method of claim 9 wherein the area impacted by the congestion is identified by an identifier selected from the group consisting of a location of the cell site represented by a global position, a location area code and a MacroCell identity.

11. The method of claim 1 wherein the first message comprises a congestion control indicator and a priority level under congestion control indicator.

12. The method of claim 1, wherein the time value varies based on a requested connection.

13. The method of claim 1, wherein the overload condition is determined when the access network controller is not able to process requests for new resources.

14. An access network controller configured to manage one or more radio access networks, monitor the one or more radio access networks for overload conditions, and receive requests via a core network component initiated by one or more mobile communications devices for connections to the one or more radio access networks, the access network controller comprising:
a processor configured to compare a priority level of a connection requested by a mobile communications device having at least one existing connection in one of the one or more radio access networks to a priority level for connections in a set of one or more existing connections in the one of the one or more radio access networks when the access network controller determines that at least a portion of the one of the one or more radio access networks is in an overload condition, and configured to generate a first message when the comparison results in a determination that the priority level of the connection requested is not equal to the priority level of connections in the set of the one or more existing connections, wherein the first message comprises a time value that specifies an amount of time required before the mobile communications device can initiate another request for network resources; and
a transmitter configured to send the first message to the core network component.

15. The access network controller of claim 14 wherein the processor is further configured to retrieve a record of the priority level for the connections in the set of the one or more existing connections, extract the priority level of the connection requested from a received request, determine at least one difference between the priority level of the connection requested and the priority level of the connections of the set of the one or more existing connections, and generate the first message to comprise a grant or a rejection indicator based on an outcome of the comparison.

16. The access network controller of claim 14 further comprising a storage component connected to the processor, the storage component being configured to store at least one record of the priority level of the connections of the set of the one or more existing connections in the one or more radio access networks.

17. The access network controller of claim 14 wherein the first message comprises an identifier of an area impacted by congestion.

18. The access network controller of claim 14 wherein the first message comprises a priority level under congestion control indicator.

19. An non-transitory computer-readable storage medium having computer executable instructions encoded therein, said computer readable instructions adapted to be executed to implement a method comprising:
receiving a request from a core network component to provide an additional connection to a mobile communications device that has one or more existing connections to the radio access network;
determining that at least a portion of the radio access network is in an overload condition; and
sending a message to the core network component, wherein the message comprises a time value that specifies an amount of time required before the mobile communications device can initiate another request for network resources.

20. A communications device comprising:
a processor configured to
generate, while having one or more connections to a radio access network, a first request to a core network for an additional connection to the radio access network,
initialize a timer to a time value received in a response to the first request, wherein the time value specifies an amount of time required before the mobile communications device can initiate another request for network resources, and store a priority level under congestion control indicator received in the response to the first request; and a memory component associated with the processor for storing the time value of the timer and the priority level under congestion control indicator.

21. The communications device of claim 20, wherein the processor is configured to generate a second request to the core network for another connection when a priority level of the second request is higher than the priority level under congestion control indicator.

22. The communications device of claim 20, wherein the processor is configured to clear the timer in response to a determination that the communications device has left the area impacted by congestion and to generate a renewed first request to the core network for the additional connection to the radio access network after the timer is cleared.

23. The communications device of claim 20, wherein the processor is configured to prevent another request to the core network for the additional connection to the radio access network while the timer has a non-zero value.

24. An apparatus, comprising:

a processor configured to compare a priority level of a new connection requested by a mobile communications device that has at least one existing connection in one of one or more radio access networks to a priority level for connections in a set of one or more existing connections in the one of the one or more radio access networks, determine at least one difference between the priority level of the new connection requested and the priority level of the connections of the set of the one or more existing connections, and generate a message based on an outcome of the comparison, wherein the message comprises a time value that specifies an amount of time required before the mobile communications device can initiate another request for network resources.

\* \* \* \* \*